May 26, 1964
W. T. BEAN, JR
3,134,884
ELECTRIC SOLDERING IRON
Filed June 21, 1962
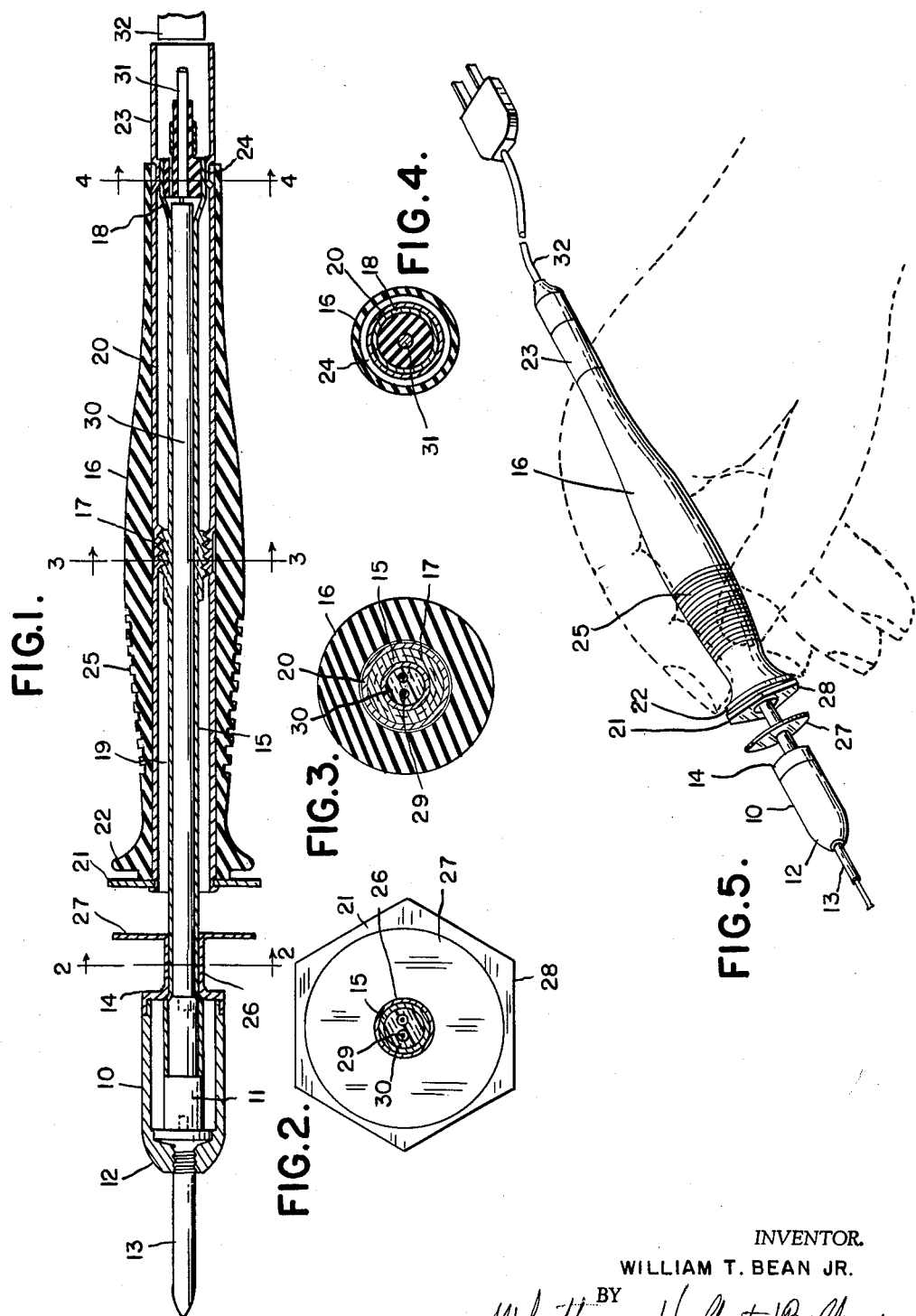
INVENTOR.
WILLIAM T. BEAN JR.
BY
Whittemore, Hulbert & Belknap
ATTORNEYS

United States Patent Office 3,134,884
Patented May 26, 1964

3,134,884
ELECTRIC SOLDERING IRON
William T. Bean, Jr., Detroit, Mich., assignor to American Electrical Heater Company, Detroit, Mich., a corporation of Michigan
Filed June 21, 1962, Ser. No. 204,184
6 Claims. (Cl. 219—233)

The invention relates to electric tools and more particularly to electric soldering irons.

The principal object of the invention is to attain a small, lightweight, easily handled, electric soldering iron adapted for use in electronic equipment manufacture and capable of use under magnification.

A further object is to provide such a compact tool with sufficient heating capacity, for continuous use at a high rate of production. To this end, the invention consists in the construction hereinafter set forth.

In the drawings:

FIGURE 1 is a longitudinal section through the soldering iron.

FIGURE 2 is a cross section on the line 2—2 of FIGURE 1.

FIGURE 3 is a cross section on the line 3—3 of FIGURE 1.

FIGURE 4 is a cross section on the line 4—4 of FIGURE 1.

FIGURE 5 is the perspective view of the soldering iron.

Referring to the drawings, the soldering iron comprises a casing 10 for a heating element 11. The casing is a hollow shell having a rounded front end 12 in the center of which is threadedly attached a soldering tip 13. The rear end of the heater casing is closed by a header 14 which is mounted at the forward end of the central tube 15. This tube is the main structural element which imparts rigidity to the entire assembly. It is composed of stainless steel which, in addition to its properties of strength and ability to resist corrosion under heat, also possesses low heat conductivity. The handle 16 surrounds the central tube and extends forwardly to a point rather close to the heating element. The handle is of a size and shape to permit grasping the same between the thumb and fingers in the same manner as a pen or pencil. This brings the fingers close to the source of heat. In order to permit the fingers to be comfortably placed so close to the heating element, my invention contemplates the association of a novel combination of non-conventional features whereby the temperature adjacent the fingers can be kept low. This is accomplished by the construction as hereinafter more fully described.

First, the handle has no direct contact with heated parts adjacent the heating element. The handle is mechanically supported on the central tube 15 about midway of the handle by a threaded engagement 17. The only other contact between the handle and tube is at the flaring rear end 18 of the central tube. The handle is insulated from the central tube by the annular air space 19 between the two parts so that whatever heat is transferred by conduction, as distinguished from convection and radiation, enters the handle at about its mid point. The interior of the handle is provided with a liner formed by a metal tube 20 having good heat conductivity such as aluminum. Thus whatever heat enters the handle by conduction is first distributed throughout the length of this tube both forwardly and rearwardly of the threaded engagement 17. The front end of tube 20 is attached to the disk 21. This disk has a radial dimension greater than the diameter of the front end 22 of the handle. The rear end of tube 20 has a portion projecting beyond handle 16 forming a socket 23. The tube also has the inwardly deflected bearing portion 24 for engaging the flare 18 of the central tube. The handle is provided with antislip fins 25 to facilitate grasping with the fingers. The handle is composed of a material having low heat conductivity, for example, nylon, and it is relatively thick so that the temperature of the outside surface is kept low.

The header 14 which supports the casing 10 is integral with a sleeve 26 mounted on the front end of central tube 15. In this way the casing 10 for the heating element is rigidly secured to the central tube. The sleeve is attached to a disc 27 forming a heat baffle spaced from the disk 21. The heating element 11 is large in volume compared to the small tip size of the compact, lightweight, soldering iron of the present invention. The element is of very fine resistance wire wound on a spool of pure alumina. After winding, the element is totally cemented to insulate the exterior surfaces of the winding and hold each element turn in its proper position. The heating element has a wattage of 22½ watts which is capable of reaching an optimum soldering temperature in about twelve minutes. This power rating is higher than normal for a tool of such compactness as described herein. The overall length from soldering tip to the rear socket is eight inches and the total weight is less than three ounces. The element fills the entire casing 10 and generates sufficient heat to produce a temperature sufficient to melt solder in approximately four minutes. The maximum temperature of about 700° F. is obtained within twelve minutes. In spite of this high wattage, the soldering tool is so designed that the fingers of the operator may be kept on the forward end of the handle about an inch away from the heating element. The low temperature at the finger end of the handle is maintained by the cooperation of the various novel features herein described. The heat flow by conduction is minimized by the small cross section of central tube 15 and its low heat conductivity. Whatever heat is conducted through tube 15 is transmitted to the handle at a point removed from the front end thereof. The heat is transmitted through the threads 17 into the aluminum lining tube 20 at about the midpoint of the handle where it has the greatest thickness. It is then conducted by the lining tube both forwardly and rearwardly so that the heat is spread out for the full length of the handle and not concentrated at any one place. The heat from the front end of tube 20 is dissipated outwardly through the disk 21 while the heat from the rear end of tube 20 is dissipated from the socket 23.

The two spaced disks 27 and 21 protect the fingers from radiated heat emanating from the heated casing 10.

It will be observed from FIGURE 5 of the drawing that the soldering tool is designed to be grasped by the thumb and fingers in approximately the same manner as a writing pen or pencil. Also the tool is balanced at the grasping point so as to impart a desirable "feel" when it is being used by the operator.

It will also be observed that the rear disk or baffle 21 is provided with flat surfaces 28 forming a table rest to thereby prevent the heated tip from contact with the table and to prevent the instrument from rolling.

The terminals from the heating element 11 are connected to power leads 29 which extend through the central tube 20 being protected therefrom by the insulator 30. At the rear end of the tube, the power leads are connected to a connector 31 within the socket 23. 32 is an electric cord which engages connector 31. The electric cord is of the type utilized for other small electrical apparatus such as electric shavers.

With the electric soldering iron as above described, it will be apparent that the instrument is of high heat capacity yet light in weight and convenient for operation. It is especially valuable in the soldering of electric connections under magnification. The tip is sufficiently spaced from the fingers to provide good visibility and the fingers of the operator are close enough to the tip to provide good control with the hand serving as a natural rest and guiding element while performing the specific soldering task to be accomplished.

What I claim as my invention is:

1. An electric soldering iron comprising an electrical resistor, a surrounding metal casing, a tip attached to the casing at one end thereof, a heat conducting tube extending from the opposite end of the casing and having a threaded portion midway between the ends thereof, a handle of heat insulating material surrounding said tube and attached thereto at a point remote from said resistor, said handle being otherwise spaced from said metal casing and said tube and a liner of good heat conductivity extending within and along the entire length of said handle having a threaded portion midway between its ends engaging said threaded portion of said tube, whereby the heat conducted by said tube is conducted through said threaded engagement and is dissipated forwardly and rearwardly by said liner.

2. An electric soldering iron according to claim 1 in which said liner has a disk baffle secured thereto and extending radially thereof at the front end of said handle.

3. An electric soldering iron according to claim 2 in which a second disk baffle is attached to said metal casing and spaced rearwardly thereof in spaced relation to the first mentioned disk baffle.

4. An electric soldering iron according to claim 3 in which the first disk baffle attached to said liner is larger in radius than said second disk baffle and is provided with flat surfaces forming a table rest, and said first baffle is forward of the center of gravity so that said tip is held from contact with the table.

5. An electric soldering iron comprising a heating element, a metal casing for said element, a tube of low heat conductivity extending from said casing, a tip extending oppositely from said casing, a handle surrounding and spaced from said tube with its front end spaced from said casing, a liner for said handle extending for the length thereof and having a threaded portion midway between the ends thereof, a corresponding threaded portion on said tube for supporting said handle, said handle being composed of heat insulating material and having an outer contour of barrel shape with the largest portion thereof adjacent said threaded portions, a pair of spaced metallic baffles between said casing and said handle, one of said baffles being connected to said casing and the other baffle being connected to said liner.

6. An electric soldering iron according to claim 5 in which one of said baffles has flat surfaces forming a table rest, and said handle has an outer configuration of a size and shape to permit the grasping thereof with the thumb and fingers and a series of circumferential grooves forming antislip fins on the forward portion of said handle adjacent said baffles.

References Cited in the file of this patent

UNITED STATES PATENTS

| | | |
|---|---|---|
| 237,123 | Park | Feb. 1, 1881 |
| 1,497,628 | Young | June 10, 1924 |
| 1,927,570 | Lofthouse | Sept. 19, 1933 |
| 2,552,253 | Brown | May 8, 1951 |
| 2,951,927 | Weller | Sept. 6, 1960 |
| 3,048,687 | Knowles | Aug. 7, 1962 |

FOREIGN PATENTS

| | | |
|---|---|---|
| 364,915 | Germany | Dec. 4, 1922 |
| 560,806 | Great Britain | Apr. 20, 1944 |